(12) United States Patent
Potluru et al.

(10) Patent No.: US 12,488,135 B2
(45) Date of Patent: Dec. 2, 2025

(54) SYSTEM AND METHOD FOR WATERMARKING TABULAR DATA WHILE OBSCURING UNDERLYING DATA FOR IMPROVING DATA INTEGRITY AND SECURITY

(71) Applicant: JPMorgan Chase Bank, N.A., New York, NY (US)

(72) Inventors: Vamsi Krishna Potluru, New York, NY (US); Tucker Richard Balch, Suwanee, GA (US); Manuela Veloso, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 78 days.

(21) Appl. No.: 18/615,455

(22) Filed: Mar. 25, 2024

(65) Prior Publication Data

US 2025/0298918 A1    Sep. 25, 2025

(51) Int. Cl.
G06F 21/62    (2013.01)
G06F 21/64    (2013.01)

(52) U.S. Cl.
CPC .......... *G06F 21/6227* (2013.01); *G06F 21/64* (2013.01)

(58) Field of Classification Search
CPC ............................ G06F 21/6227; G06F 21/64
See application file for complete search history.

(56) References Cited

U.S. PATENT DOCUMENTS

| | | | |
|---|---|---|---|
| 10,373,299 B1 * | 8/2019 | Holub | G06T 3/02 |
| 11,769,241 B1 * | 9/2023 | Rhoads | G06V 20/52 |
| | | | 382/103 |
| 2003/0223584 A1 * | 12/2003 | Bradley | G06T 1/0028 |
| | | | 713/176 |
| 2004/0228502 A1 * | 11/2004 | Bradley | H04N 1/32187 |
| | | | 382/100 |
| 2011/0044494 A1 * | 2/2011 | Bradley | G10L 19/018 |
| | | | 382/100 |
| 2016/0217547 A1 * | 7/2016 | Stach | G06T 1/0064 |
| 2018/0210643 A1 * | 7/2018 | Ghassabian | G06F 3/0233 |
| 2019/0287226 A1 * | 9/2019 | Holub | G06T 3/04 |

* cited by examiner

*Primary Examiner* — J. Brant Murphy
(74) *Attorney, Agent, or Firm* — GREENBLUM & BERNSTEIN, P.L.C.

(57) ABSTRACT

A method and system for watermarking a dataset generated by a source system are disclosed. The method includes acquiring the dataset, distributing data elements included in the dataset over a range, and dividing the range into multiple bins according to a scheme. The method further includes designating each of the bins as a first or second type, tagging each data element according to according to a bin type of a bin the respective data element falls into. For each data element included in a bin of the second type, selecting a new value by sampling within a nearest bin of the first type and replacing the respective data element with a replacement data element including the new value, and watermarking each of the data elements originally included in the bins of the first type and replacement data elements for generating a watermarked dataset.

20 Claims, 16 Drawing Sheets

FIG. 8

Algorithm 1 Robust Tabular Watermarking

Input: Tabular dataset of $m \times n$ with $k$ numerical columns

1: Bin the range $[0,1]$ with size $\delta$
2: for $j = 1, \ldots, k$ do
3:    for $t = 1, \ldots, m$ do
4:       Use the mantissa (after decimal point) of $S_t$
5:       Compute the hash of the bin value in which mantissa lies in and use it to seed the random number generator.
6:       Use the random number generator to create green and red lists.
7:       if The generated value is in the green list then
8:          Pass
9:       else
10:        Find the nearest consistent green cell and (non-uniformly sample from it. Replace the mantissa of the $S_t$ with the new value.
11:       end if
12:    end for
13: end for

SYSTEM AND METHOD FOR WATERMARKING TABULAR DATA WHILE OBSCURING UNDERLYING DATA FOR IMPROVING DATA INTEGRITY AND SECURITY

TECHNICAL FIELD

This disclosure generally relates to watermarking tabular data while obscuring underlying data. More specifically, the present disclosure generally relates to a more robust watermarking tabular data to indicate source of the tabular data while obscuring underlying data to improve data security and to mitigate risks arising from malicious actors.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

Generally, a watermark stored in data may be utilized to ensure data integrity, by providing tamper detection. Conventionally, a watermark signal or data may be generated when authorized data is stored. Although watermarking of text data, such as those arising from large language models (LLMs) for mitigating risks from malicious use has been discussed, watermarking of tabular data has not been meaningfully considered and has not been able to be successfully implemented due to structural differences.

Further, although conventional watermarking may provide additional data security, conventionally watermarked data may not be robust to noise where an adversary may be present to jitter the tabular data. For example, an adversary or a malicious actor may gain access to the generated data and wishes to use the watermarked data in their own internal applications. In this regard, the adversary may be able to add noise to the watermarked data to potentially break the watermark. Alternatively, an adversary may mix real data with synthetic data, which may lead to unintended effects, such as increase of disparity in the trained models. To protect against such threats, a more robust watermarking to withstand against such onslaughts is desired for improved data security.

SUMMARY

According to an aspect of the present disclosure, a method for performing information-directed pessimism in offline reinforcement learning for reduction of distribution mismatch is provided. The method includes acquiring, by a processor, the dataset generated by the source system; distributing, by the processor, a plurality of data elements included in the dataset over a range; dividing, by the processor, the range into a plurality of bins according to a scheme among a plurality of schemes; designating, by the processor, each of the plurality of bins as a first type or a second type; tagging, by the processor, each data element among the plurality of data elements according to according to a bin type of a bin the respective data element falls into; for each data element included in a bin of the second type, selecting a new value by sampling within a nearest bin of the first type and replacing the respective data element with a replacement data element including the new value; and watermarking, by the processor, each of the data elements originally included in the bins of the first type and replacement data elements for generating a watermarked dataset.

According to another aspect of the present disclosure, the data values are distributed over the range using a scheme among the plurality of schemes stored in a database.

According to another aspect of the present disclosure, the plurality of schemes include a fixed scheme, a random scheme, a mathematical relationship scheme and a statistical distribution scheme.

According to yet another aspect of the present disclosure, the method further includes selecting, by the processor, the scheme among the plurality of schemes based on the dataset generated by the source system.

According to another aspect of the present disclosure, a number of bins of the plurality of bins is determined based on the plurality of data elements of the dataset.

According to a further aspect of the present disclosure, a number of bins of the plurality of bins is determined based on size of one or more bins of the plurality of bins.

According to yet another aspect of the present disclosure, in the designating, each of the plurality of bins is randomly designated as the first type or the second type.

According to a further aspect of the present disclosure, the new value is selected using a scheme among the plurality of schemes.

According to another aspect of the present disclosure, the scheme is a statistical distribution of the plurality of data elements.

According to a further aspect of the present disclosure, the scheme is a mathematical relationship with respect to the plurality of data elements.

According to a further aspect of the present disclosure, the scheme is a random generation.

According to a further aspect of the present disclosure, the watermarking is performed on pairs of columns of data elements.

According to a further aspect of the present disclosure, each of the pairs of columns of data elements include a seed column.

According to a further aspect of the present disclosure, the method further includes adding, by the processor, one or more artificial data elements corresponding to bins of the second type prior to the watermarking.

According to a further aspect of the present disclosure, the watermarking with the one or more artificial data elements generates a soft watermarked dataset.

According to a further aspect of the present disclosure, the method further includes computing a score that the dataset is watermarked.

According to a further aspect of the present disclosure, the score that the dataset is watermarked is calculated according to a below relationship:

$$z = 2(m_g - km/2)/\sqrt{mk}.$$

For the above noted relationships, z is the score, $m_g$ is a number of data elements that have been assigned to the bin of the first type, k is a number of numerical columns in the dataset, and m is a number of the data elements included in the dataset.

According to a further aspect of the present disclosure, the method further includes comparing the score that the dataset is watermarked against a reference threshold.

According to a further aspect of the present disclosure, when the score that the dataset is watermarked is greater than the reference threshold, labeling the dataset as watermarked.

According to a further aspect of the present disclosure, when the score that the dataset is watermarked is less than the reference threshold, selecting a different scheme among the plurality of schemes until the score that the dataset is watermarked is calculated to be greater than the reference threshold.

According to an aspect of the present disclosure, a system for watermarking a dataset generated by a source system is provided. The system includes a memory, a display and a processor. The system is configured to perform: acquiring the dataset generated by the source system; distributing a plurality of data elements included in the dataset over a range; diving the range into a plurality of bins according to a scheme among a plurality of schemes; designating each of the plurality of bins as a first type or a second type; tagging each data element among the plurality of data elements according to according to a bin type of a bin the respective data element falls into; for each data element included in a bin of the second type, selecting a new value by sampling within a nearest bin of the first type and replacing the respective data element with a replacement data element including the new value; and watermarking each of the data elements originally included in the bins of the first type and replacement data elements for generating a watermarked dataset.

According to another aspect of the present disclosure, a non-transitory computer readable storage medium that stores a computer program for watermarking a dataset generated by a source system is provided. The computer program, when executed by a processor, causes a system to perform multiple processes including: acquiring the dataset generated by the source system; distributing a plurality of data elements included in the dataset over a range; diving the range into a plurality of bins according to a scheme among a plurality of schemes; designating each of the plurality of bins as a first type or a second type; tagging each data element among the plurality of data elements according to according to a bin type of a bin the respective data element falls into; for each data element included in a bin of the second type, selecting a new value by sampling within a nearest bin of the first type and replacing the respective data element with a replacement data element including the new value; and watermarking each of the data elements originally included in the bins of the first type and replacement data elements for generating a watermarked dataset.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 8 illustrates an algorithm for watermarking of data in accordance with an exemplary embodiment.

DETAILED DESCRIPTION

Figure 1:
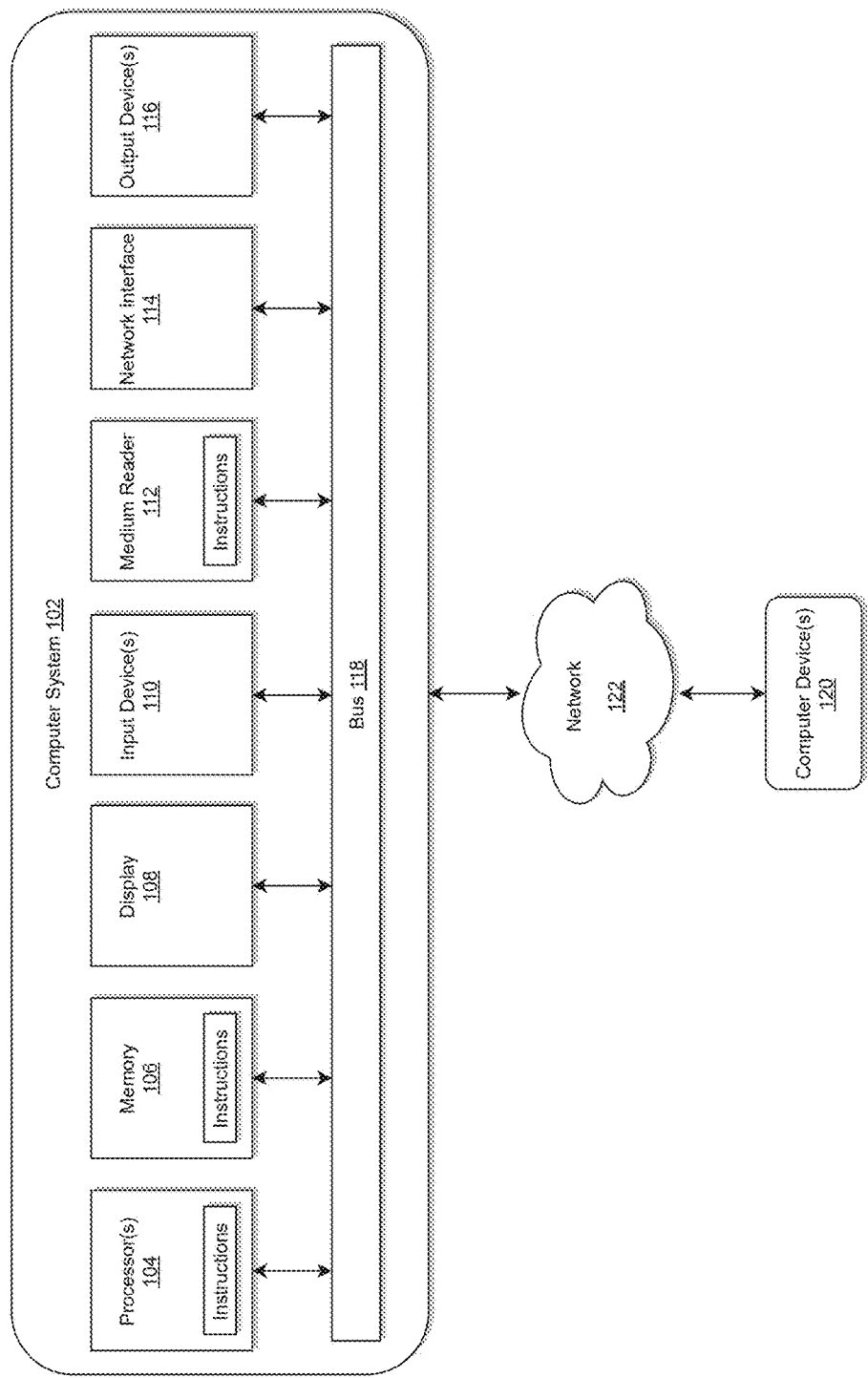
FIG. 1 illustrates a computer system for implementing a robust tabular watermarking (RTW) system for offline reinforcement learning in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 illustrates a computer system for implementing a Robust Tabular Watermarking (RTW) system for offline reinforcement learning in accordance with an exemplary embodiment.

The system 100 is generally shown and may include a computer system 102, which is generally indicated. The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, Blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The network interface 114 may include, without limitation, a communication circuit, a transmitter or a receiver. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, or the like.

The computer system 102 may be in communication with one or more additional computer devices 120 via a network 122. The network 122 may be, but is not limited thereto, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

Figure 2:
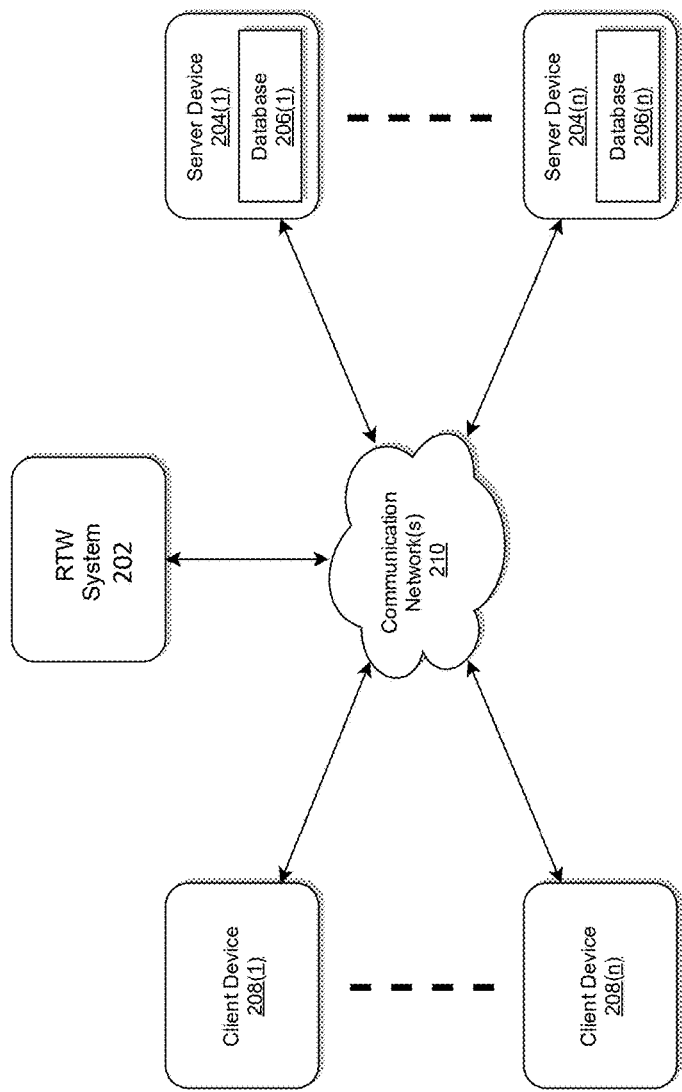
FIG. 2 illustrates an exemplary diagram of a network environment with a RTW system for offline reinforcement learning in accordance with an exemplary embodiment.

FIG. 2 illustrates an exemplary diagram of a network environment with a RTW system for offline reinforcement learning in accordance with an exemplary embodiment.

A RTW system 202 may be implemented with one or more computer systems similar to the computer system 102 as described with respect to FIG. 1.

The RTW system 202 may store one or more applications that can include executable instructions that, when executed by the RTW system 202, cause the RTW system 202 to perform actions, such as to execute, transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment or other networking environments. The application(s) may be executed within or as virtual machine(s) or virtual server(s) that may be managed in a cloud-based computing environment. Also, the application(s), and even the RTW system 202 itself, may be located in virtual server(s) running in a cloud-based computing environment rather than being tied to one or more specific physical network computing devices. Also, the application(s) may be running in one or more virtual machines (VMs) executing on the RTW system 202. Additionally, in one or more embodiments of this technology, virtual machine(s) running on the RTW system 202 may be managed or supervised by a hypervisor.

In the network environment 200 of FIG. 2, the RTW system 202 is coupled to a plurality of server devices 204(1)-204(n) that hosts a plurality of databases 206(1)-206(n), and also to a plurality of client devices 208(1)-208(n) via communication network(s) 210. According to exemplary aspects, databases 206(1)-206(n) may be configured to store data that relates to distributed ledgers, blockchains, user account identifiers, biller account identifiers, and payment provider identifiers. A communication interface of the RTW system 202, such as the network interface 114 of the computer system 102 of FIG. 1, operatively couples and communicates between the RTW system 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the RTW system 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The RTW system 202 may be a standalone device or integrated with one or more other devices or apparatuses, such as one or more of the server devices 204(1)-204(n), for example. In one particular example, the RTW system 202 may be hosted by one of the server devices 204(1)-204(n), and other arrangements are also possible. Moreover, one or more of the devices of the RTW system 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the RTW system 202 via the communication network(s) 210 according to the HTTP-based protocol, for example, although other protocols may also be used. According to a further aspect of the present disclosure, in which the user interface may be a Hypertext Transfer Protocol (HTTP) web interface, but the disclosure is not limited thereto.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the RTW system 202 that may efficiently provide a platform for implementing a cloud native RTW system module, but the disclosure is not limited thereto.

The client devices 208(1)-208(n) may run interface applications, such as standard web browsers or standalone client applications, which may provide an interface to communicate with the RTW system 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the RTW system 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the RTW system 202, the server devices 204(1)-204(n), or the client devices 208(1)-208(n), for example, may be configured to operate as virtual instances on the same physical machine. For example, one or more of the RTW system 202, the server devices 204(1)-204(n), or the client devices 208(1)-208(n) may operate on the same physical device rather than as separate devices communicating through communication network(s) 210. Additionally, there may be more or fewer RTW system 202, server devices 204(1)-204(n), or client devices 208(1)-208(n) than illustrated in FIG. 2. According to exemplary embodiments, the RTW system 202 may be configured to send code at run-time to remote server devices 204(1)-204(n), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
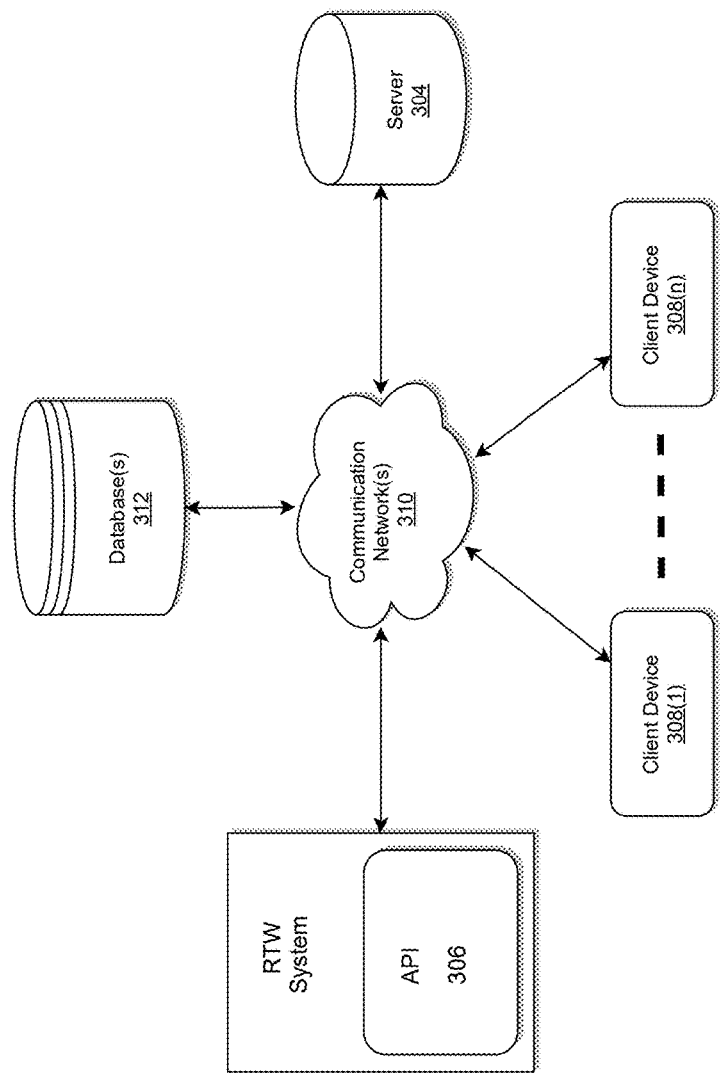
FIG. 3 illustrates a system diagram for implementing a RTW system in accordance with an exemplary embodiment.

FIG. 3 illustrates a system diagram for implementing a RTW system for offline reinforcement learning in accordance with an exemplary embodiment.

As illustrated in FIG. 3, the system 300 may include a RTW system 302 within which a group of API modules 306 is embedded, a server 304, a database(s) 312, a plurality of client devices 308(1) . . . 308(n), and a communication network 310.

According to exemplary embodiments, the RTW system 302 including the API modules 306 may be connected to the server 304, and the database(s) 312 via the communication network 310. Although there is only one database that has been illustrated, the disclosure is not limited thereto. Any number of databases may be utilized. The RTW system 302 may also be connected to the plurality of client devices 308(1) . . . 308(n) via the communication network 310, but the disclosure is not limited thereto.

According to exemplary embodiment, the RTW system 302 is described and shown in FIG. 3 as including the API modules 306, although it may include other rules, policies, modules, databases, or applications, for example. According to exemplary embodiments, the database(s) 312 may be embedded within the RTW system 302. According to exemplary embodiments, the database(s) 312 may be configured to store configuration details data corresponding to a desired data to be fetched from one or more data sources, but the disclosure is not limited thereto.

According to exemplary embodiments, the API modules 306 may be configured to receive real-time feed of data or data at predetermined intervals from the plurality of client devices 308(1) . . . 308(n) via the communication network 310.

The API modules 306 may be configured to implement a user interface (UI) platform that is configured to enable RTW system as a service for a desired data processing scheme. The UI platform may include an input interface layer and an output interface layer. The input interface layer may request preset input fields to be provided by a user in accordance with a selection of an automation template. The UI platform may receive user input, via the input interface layer, of configuration details data corresponding to a desired data to be fetched from one or more data sources. The user may specify, for example, data sources, parameters, destinations, rules, and the like. The UI platform may further fetch the desired data from said one or more data sources based on the configuration details data to be utilized for the desired data processing scheme, automatically implement a transformation algorithm on the desired data corresponding to the configuration details data and the desired data processing scheme to output a transformed data in a predefined format, and transmit, via the output interface layer, the transformed data to downstream applications or systems.

The plurality of client devices 308(1) . . . 308(n) are illustrated as being in communication with the RTW system 302. In this regard, the plurality of client devices 308(1) . . . 308(n) may be "clients" of the RTW system 302 and are described herein as such. Nevertheless, it is to be known and understood that the plurality of client devices 308(1) . . . 308(n) need not necessarily be "clients" of the RTW system 302, or any entity described in association therewith herein. Any additional or alternative relationship may exist between either or both of the plurality of client devices 308(1) . . . 308(n) and the RTW system 302, or no relationship may exist.

The first client device 308(1) may be, for example, a smart phone. Of course, the first client device 308(1) may be any additional device described herein. The second client device 308(n) may be, for example, a personal computer (PC). Of course, the second client device 308(n) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the plurality of client devices 308(1) . . . 308(n) may communicate with the RTW system 302 via broadband or cellular communication. Of course, these embodiments are merely exemplary and are not limiting or exhaustive.

The client devices 308(1) . . . 308(n) may be the same or similar to any one of the client devices 208(1)-208(n) as described with respect to FIG. 2, including any features or combination of features described with respect thereto. The RTW system 302 may be the same or similar to the RTW system 202 as described with respect to FIG. 2, including any features or combination of features described with respect thereto.

Figure 4:
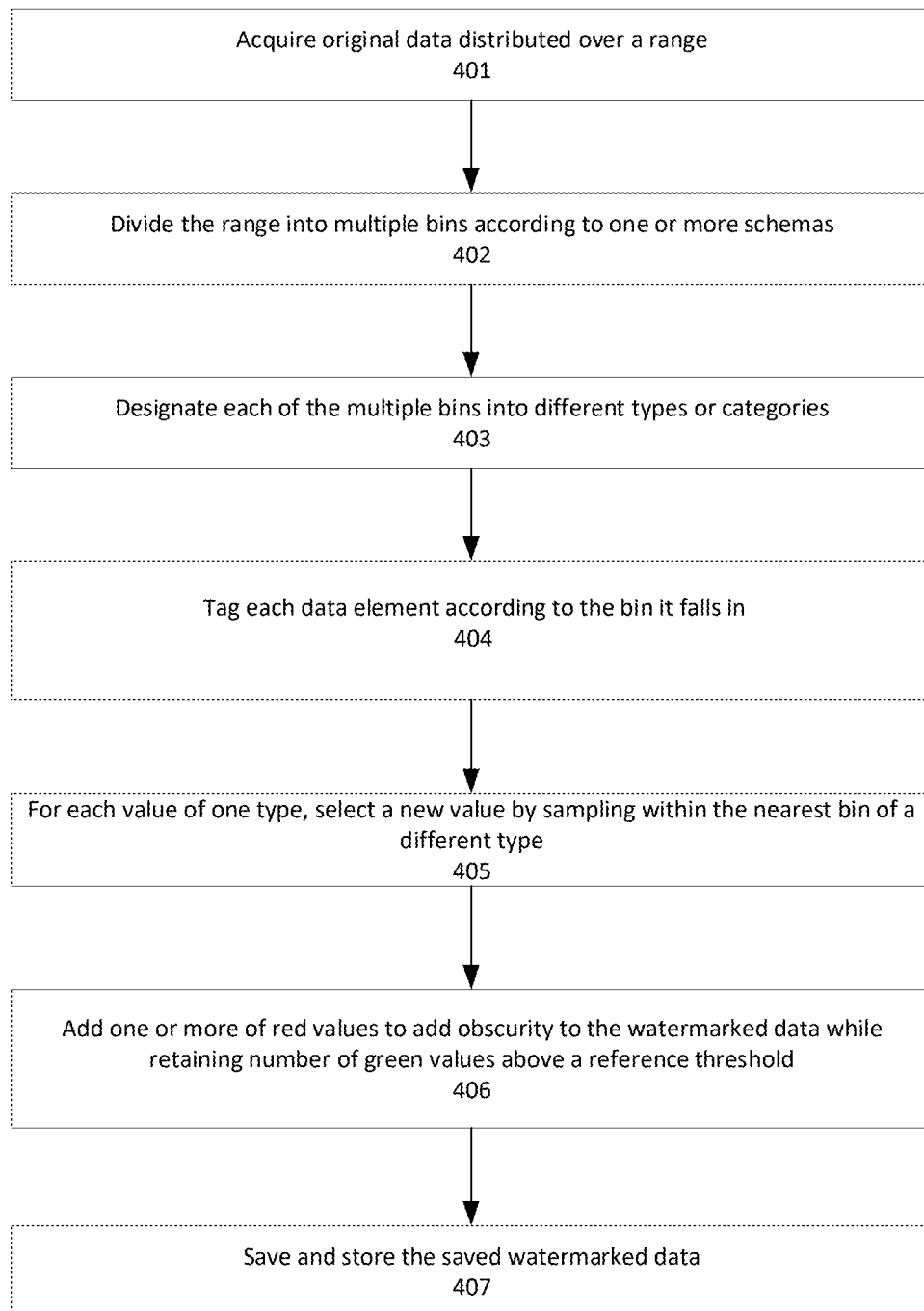
FIG. 4 illustrates a method for watermarking tabular data in accordance with an exemplary embodiment.

FIG. 4 illustrates a method for watermarking tabular data in accordance with an exemplary embodiment. FIGS. 5A-5F illustrate a process flow for watermarking tabular data in accordance with an exemplary embodiment.

According to exemplary aspects, watermarking may be detected without access to a generative model, accordingly, watermarking may be utilized to more quickly verify or validate authenticity of underlying data. Further, because watermarking may be detected without access to a generative model, new tabular dataset may be generated without retraining a model. Moreover, as watermarking may be applied to each data value included in a tabular data, watermarking may be detected even without access to the entirety of the underlying tabular data. Lastly, as watermarking is unable to be removed without adding significant noise, it provides an effective avenue for authenticating source of the underlying data.

However, although watermarking may provide additional data security, conventionally watermarked data may not be robust to noise where an adversary may be present to jitter the tabular data. For example, an adversary may gain access to the generated data and wishes to use the watermarked data in their own internal applications. In this regard, the adversary may be able to add noise to the tabular data to potentially break the watermark. To protect against such threats, a more robust watermarked tabular data may be generated using the exemplary method illustrated in FIG. 4, which is described in more detail below.

In operation 401, original data distributed over a range is acquired from a source system. According to exemplary aspects, the range may specify a lower limit value or a starting point and an upper limit value or an ending point. In an example, the lower limit value and/or the upper limit value may or may not correspond to a data element or value. Between the lower limit value and the upper limit value, the data elements or values included in the original dataset are distributed. In an example, the original dataset may be distributed randomly, according to a statistical distribution, according to a mathematical relationship or the like. According to an exemplary aspects, the range may be specified based on the data values or a number of the data elements included in the original dataset. For example, the range may be set for statistical accuracy, based on a business requirement, based on a timeframe or the like.

Figure 5A:
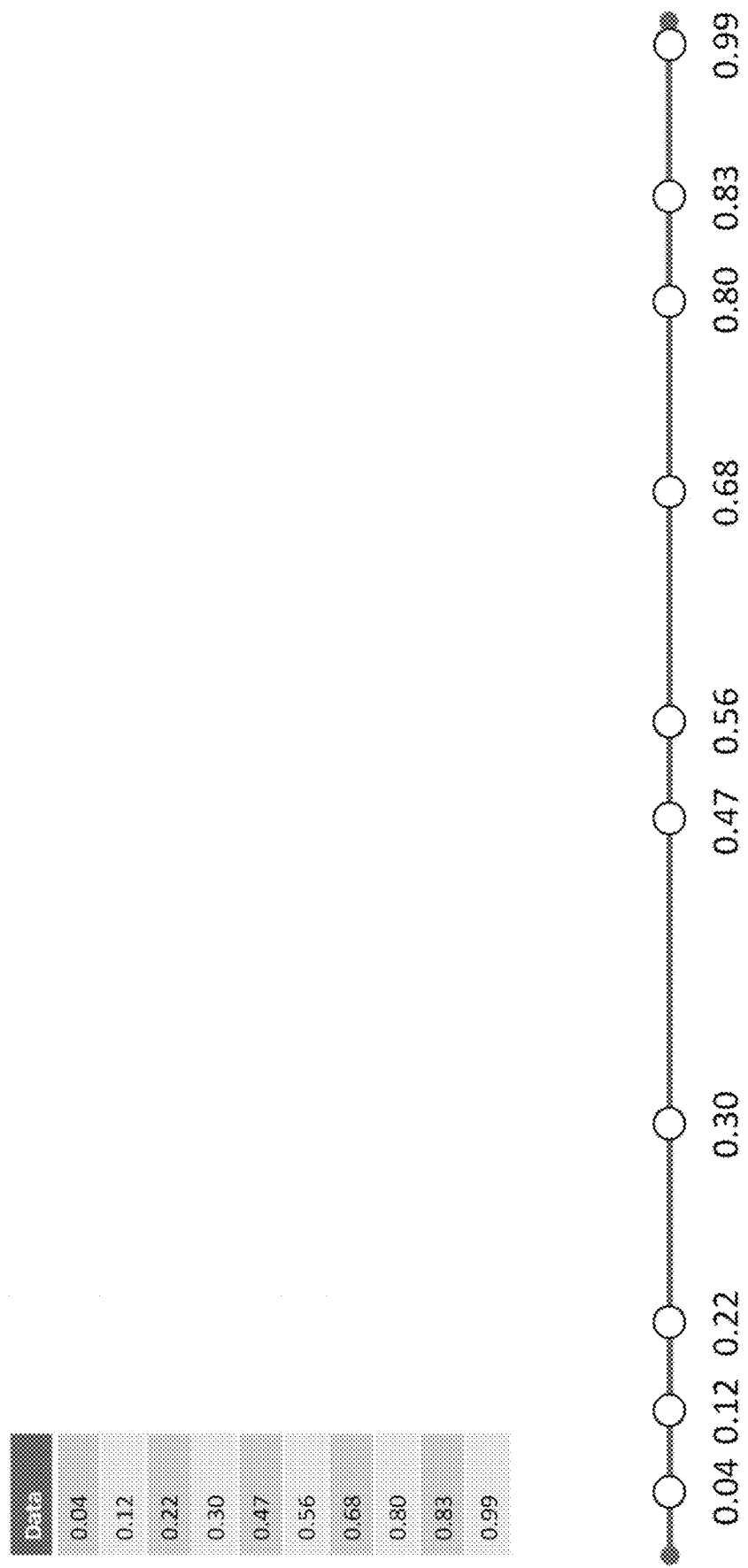
FIGS. 5A-5F illustrate a process flow for watermarking tabular data in accordance with an exemplary embodiment.

As exemplarily illustrated in FIG. 5A, the range may be between a value of 0 and a value of 1.00. The original data values are non-uniformly distributed over the range, and includes values of 0.04, 0.12, 0.22, 0.30, 0.47, 0.56, 0.68, 0.80, 0.83 and 0.99.

In operation 402, the range of values are divided into multiple bins according to a scheme among multiple schemes that may be prestored. According to exemplary aspects, a bin size and a number of bins may depend on the range of dataset that are to be watermarked. Further, the bin sizes for the multiple bins may not be uniform in size, such that certain bins may be smaller than other bins. Moreover, according to further aspects, dictionary of watermarking schemes may be pre-stored and correspond to different binning sizes. A dictionary of watermarking scheme corresponding to the selected binning size may automatically be applied during generation time. However, aspects of the present disclosure are not limited thereto, such that the size of the bins and number of bins to which the identified range is split into may be manually set, determined based on historical or type of data, determined based on strength of watermarking selected or necessary, determined based on a size of the range and/or determined by one or more machine learning (ML) or artificial intelligence (AI) algorithms or models.

Figure 5B:
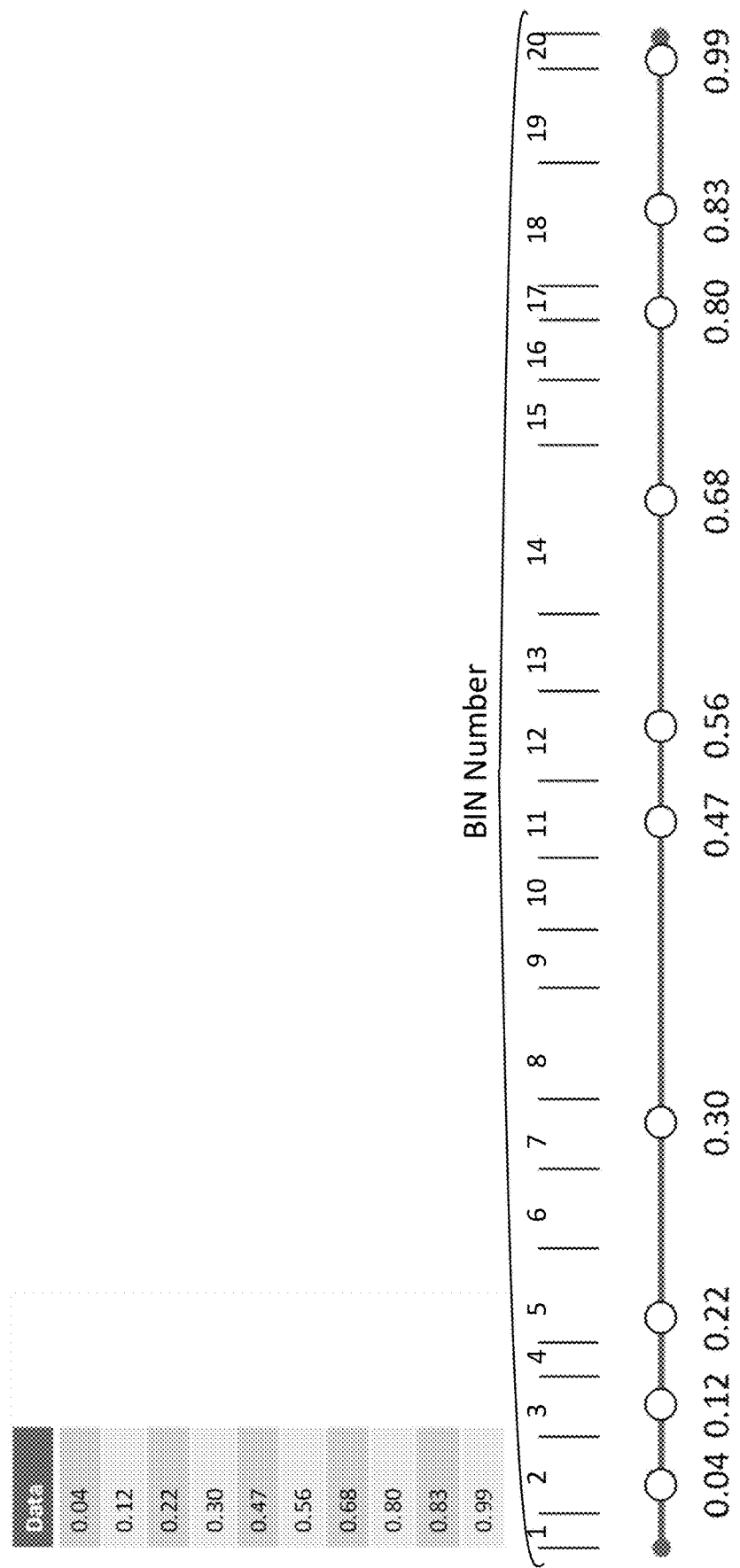

According to exemplary aspects, the watermarking schemes may include, without limitation, a fixed scheme, a random scheme, a scheme based on statistical distribution, a scheme based on a mathematical relationship and other uniquely defined schemes. For example, under a fixed scheme, each of the bins are of the same size. However, as illustrated in FIG. 5B, the multiple bins may of different sizes under different schemes. Further, number of bins may be specified based on bin sizes necessary for the data values distributed over the range. According to exemplary aspects, one or more bin sizes may be selected or defined according to a scheme selected. In FIG. 5B, twenty non-uniform sized bins are defined for the distributed data, arranged from left to right direction. As further illustrated in FIG. 5B, each of the bins are adjacent to one another without space therebetween. Also, not all of the bins will include an originally distributed data value.

Figure 5C:
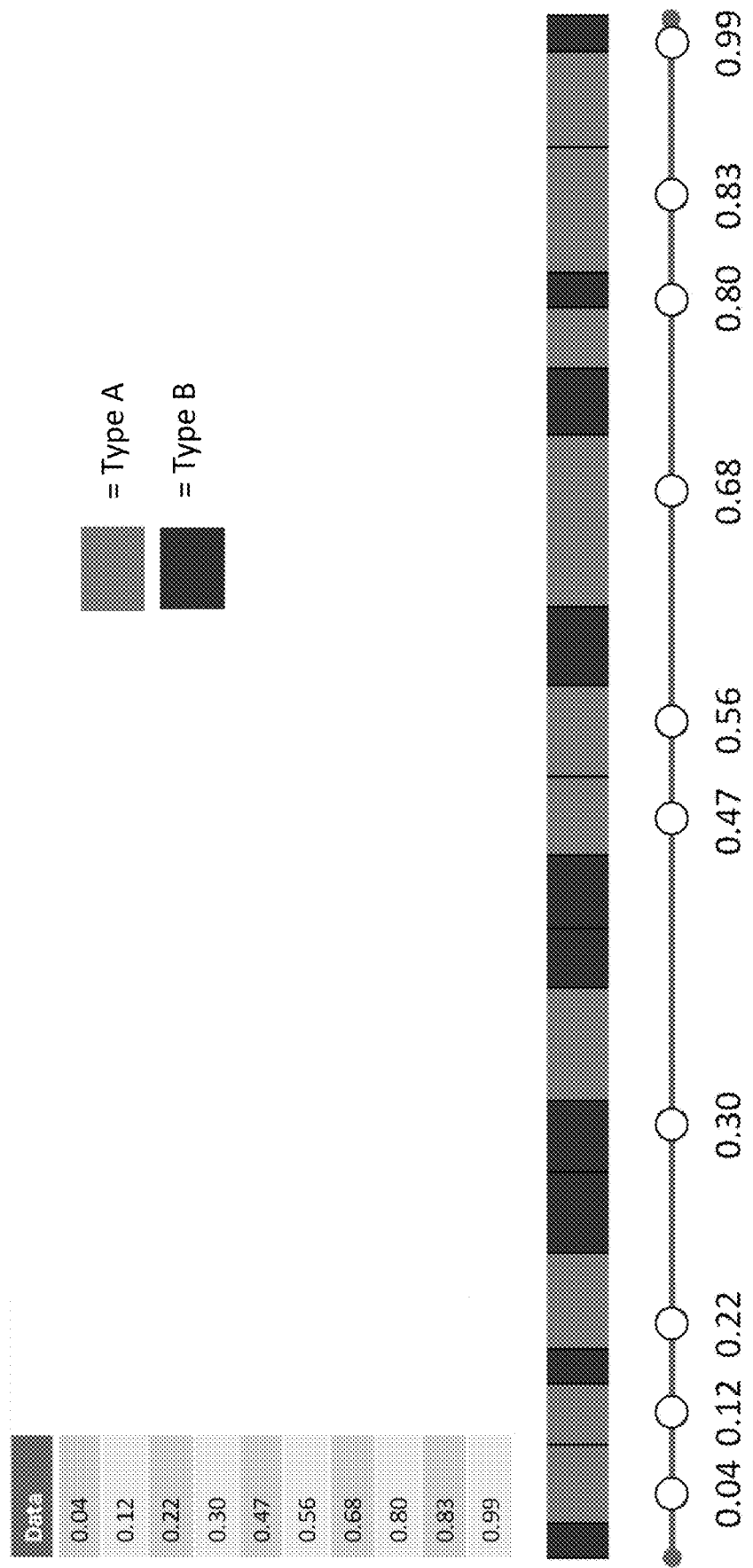

In operation 403, each of the multiple bins is designated into a particular bin type among different types or categories. According to exemplary aspects, each of the defined bins may be attributed to a particular type or category by a random generator. According to further aspects, the different types attributed may be binary, such as type I and II, type A and type B, red type and green type, and the like. As illustrated in FIG. 5C, each of the multiple bins are assigned to either a first type (i.e., type A) or a second type (i.e., type B). More specifically, first bin to the twentieth bins are arranged in a left to right direction in FIG. 5C. The first bin is assigned to the second type, the second bin and the third bin are assigned to the first type. The fourth bin is assigned to the second type and the fifth bin is assigned to the first type. The sixth bin and the seventh bin are assigned to the second type. The eighth bin is assigned to the first type, and the nineth and tenth bins are assigned to the second type. The eleventh and the twelfth bins are assigned to the first type. The thirteenth bin is assigned to the second type, which is followed by the fourteenth bin assigned to the second bin. The fifteenth bin is assigned to the second type, which is followed by the sixteenth bin assigned to the first type. The seventeenth bin is assigned to the second type, with the eighteenth and nineteenth bins assigned to the first type. Lastly, the twentieth bin is assigned to the second type. As illustrated above, the bins are randomly assigned to different types without any particular pattern.

Although binary bin types are disclosed herein, aspects of the present disclosure are not limited thereto, such that the bins may be designated or assigned to one of multiple bin types, in which the multiple bin types include more than two bin types.

Figure 5D:
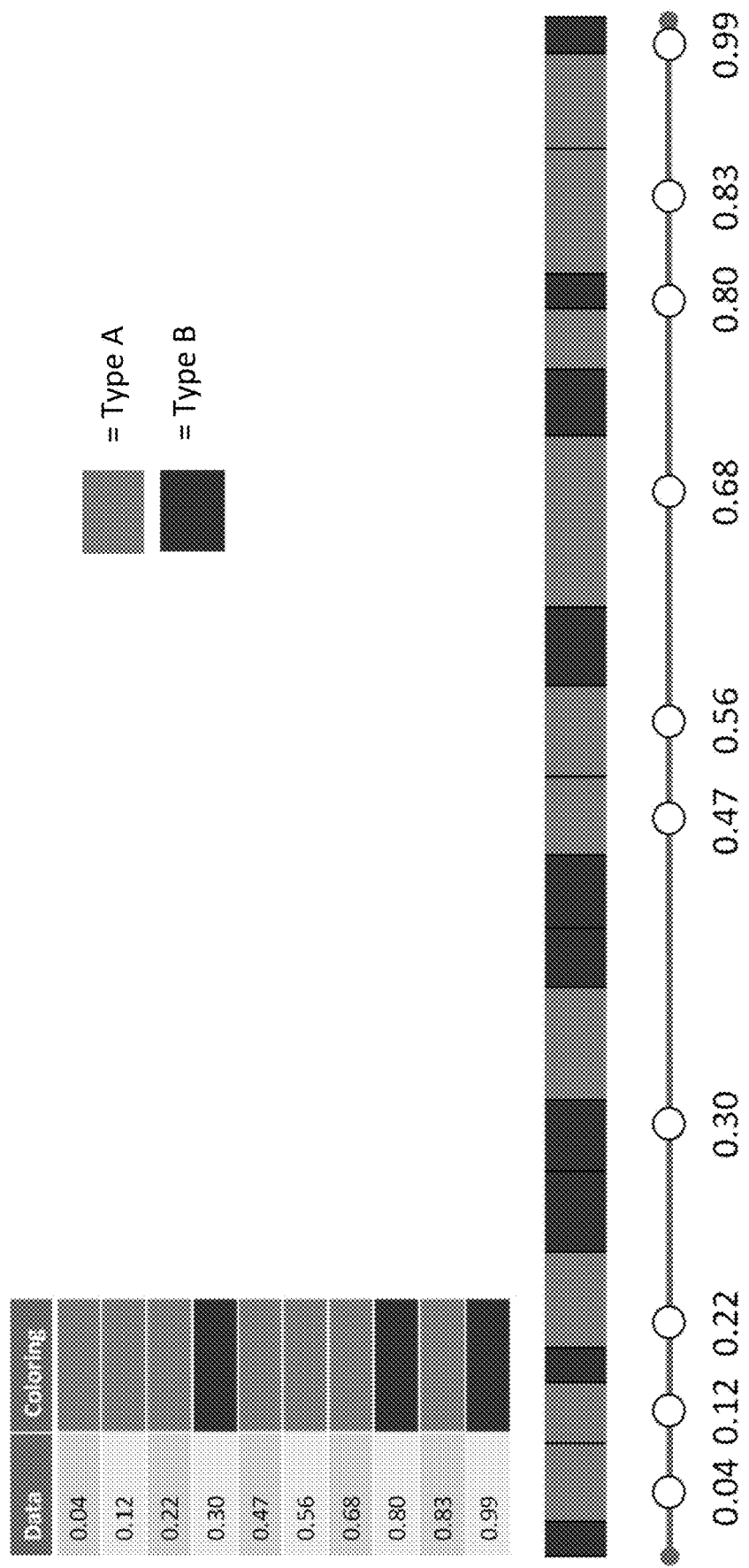

In operation 404, each data element is tagged according to the bin the respective data element falls into. Not all of the bins created will include a distributed data element. More specifically, some of the bins will include a data element (e.g., a numerical value), whereas other bins will not include a data element. As illustrated in FIG. 5D, each of bins 2, 3, 5, 7, 11, 12, 14, 17, 18 and 20 include a data element, whereas bins 1, 4, 6, 8, 9, 10, 13, 15, 16 and 19 are void of data elements or values. Further, a bin type is identified for each of the bins including the data element. More specifically, bin types of bins including the data element are identified. As illustrated in FIG. 5D, it is determined that each of data elements or values 0.04, 0.12, 0.22, 0.47, 0.56, 0.68 and 0.83 falls in a bin of the first type. Also, each of data elements or values 0.30, 0.80 and 0.99 falls in a bin of the second type. Although only three data elements out of ten distributed data elements are assigned to bins of the second type, it is noted that given a larger sample size (n), a distribution that is closer to an approximate 50-50 distribution with a standard deviation of $1/(\sqrt{n})$ is expected.

In operation 405, for each data element in a bin of one type (e.g., type A), a new value may be selected for the respective data element by sampling within the nearest bin of a different bin type (e.g., type B). According to exemplary aspects, sampling is performed uniformly, randomly, in accordance with a mathematical relationship, according to a statistical distribution, or according to another scheme. The new value selected from the nearest bin of the different bin type may be set as a replacement data value.

Figure 5E:
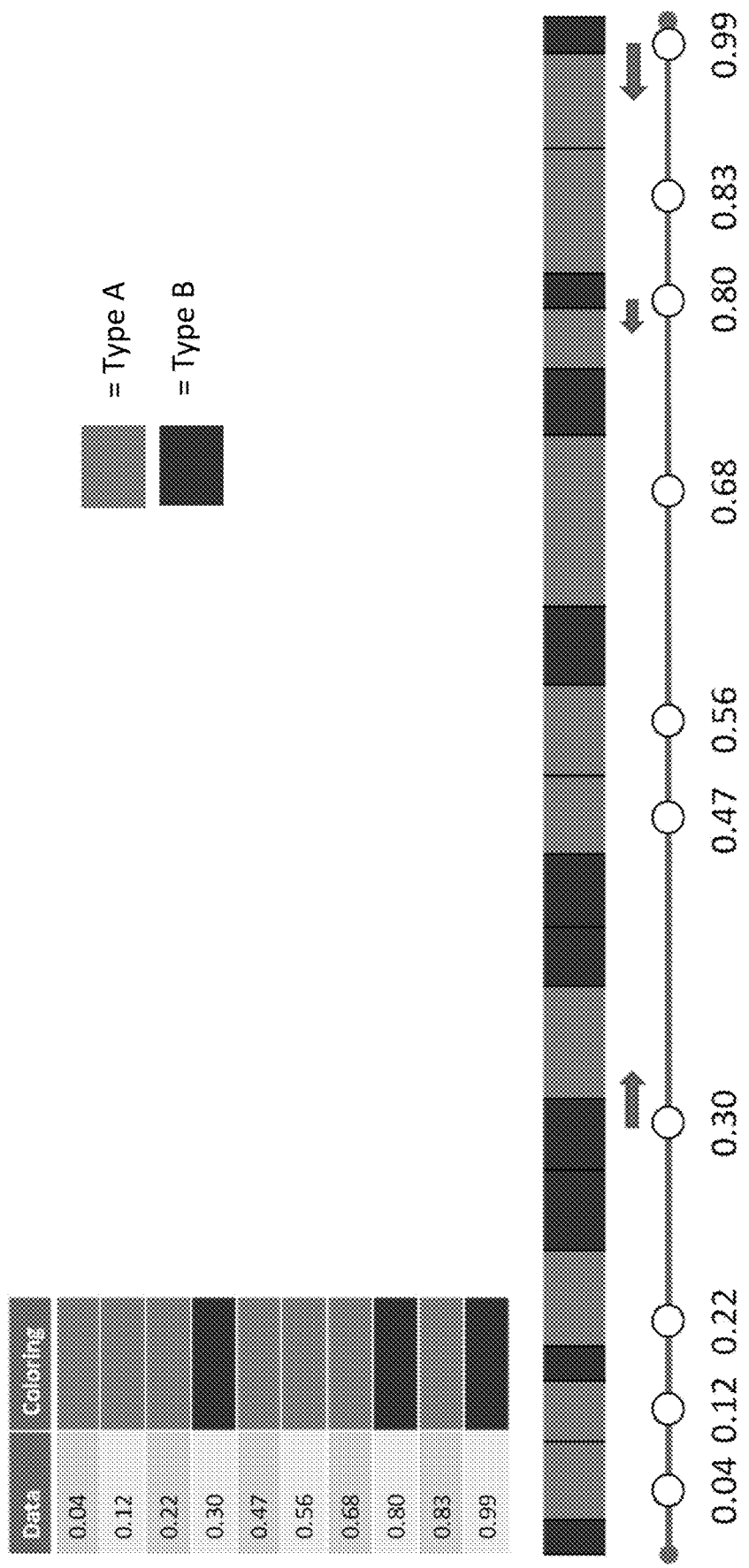
Figure 5F:
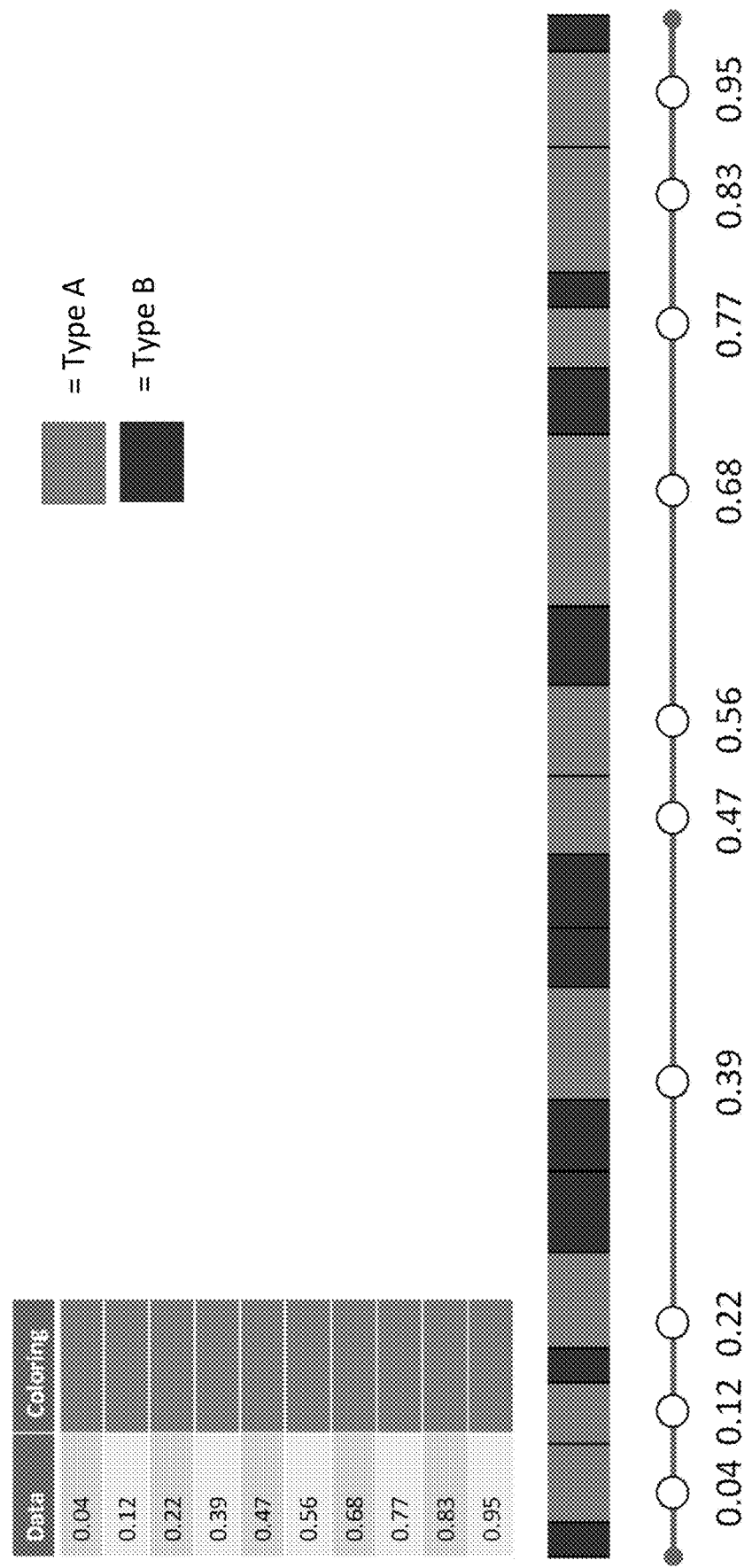

As exemplarily illustrated in FIG. 5E, for each of the data values of the second bin type or type B (i.e., 0.30, 0.80 and 0.99), a new value is sampled within the nearest bin of the first bin type or type A. More specifically, for the data value of 0.30 included in the seventh bin, a new data value is sampled from the nearest bin of the different type (i.e., first bin type), which is the eighth bin (eighth bin of the different type is closer than the fifth bin). For example, if the eighth bin includes values between 0.35 and 0.40, a data value of 0.39 may be sampled or selected as the new data element or value and replaces the previous data element or value of 0.30 as illustrated in FIG. 5F. Similar steps are taken for the data elements or values 0.80 and 0.99. In this regard, a new data element or value from the nearest bin to the data element or value of 0.80 included in the eighteenth bin of the second type or type B is selected as a replacement data value. As illustrate din FIG. 5F, the data element of 0.80 of the seventeenth bin is replaced with the data element of 0.77 in the sixteenth bin. Similarly, the data element of 0.99 included in the twentieth bin is replaced with the data element of 0.95 in the nineteenth bin. Upon completion of operation 405, all of the bins including the distributed data elements, including the replacement data elements or values, correspond to the same bin type (i.e., the first type or type A). As exemplarily illustrated in FIG. 5F, all of the bins for the data values after operation 405, including both original and replaced data elements or values, belong to bins of the first type or type A.

In operation 406, one or more data elements or values of a differing bin type (e.g., second type or type B) may be inserted to the distributed data elements (that now all belongs to the bins of the first type or type A) to add obscurity to the watermarked data. According to exemplary aspects, such data elements or values for adding obscurity may be added while retaining the number of data values of the first type or type A above a reference threshold. For example, the number of artificially inserted data elements to be limited to 10% of the total number of data elements. Here, the artificially added data values may not correspond to a seed value (e.g., not an original value or a replacement value of an original value) as such values were added for obscuring the underlying data from malicious actors. According to exemplary aspects, the insertion of the artificially generated data may provide for soft watermarking of underlying data, which may be helpful in obscuring underlying data for improvement of data security. Hard watermarked data, unlike soft watermarked data, may be void of artificially inserted data.

In operation 407, watermarking is applied to the distributed data including both the original data values as well as replaced data values for generating a watermarked dataset. The watermarked dataset is then saved and stored in a database, which may be available for analysis and data manipulations while retaining the watermarked source information. According to exemplary aspects, the watermarked data may include a reference ratio of data values corresponding to bins of the first type and artificially added data values corresponding to bins of the second type (e.g., 90 to 10 ratio). In an example, watermarking may be performed on pairs of data columns, where one of the data columns including a seed column including data values related to another data column. Moreover, the watermarking of operation 407 may watermark each data value, such that even when the watermarked file is spliced or otherwise manipulated to extract a subset of data, watermark may still remain intact to ensure origin information of the respective data. Accordingly, watermark information may be retained even for modified or manipulated data. For example, truncation of data or other data manipulation may still leave the robust watermark intact.

Figure 6:
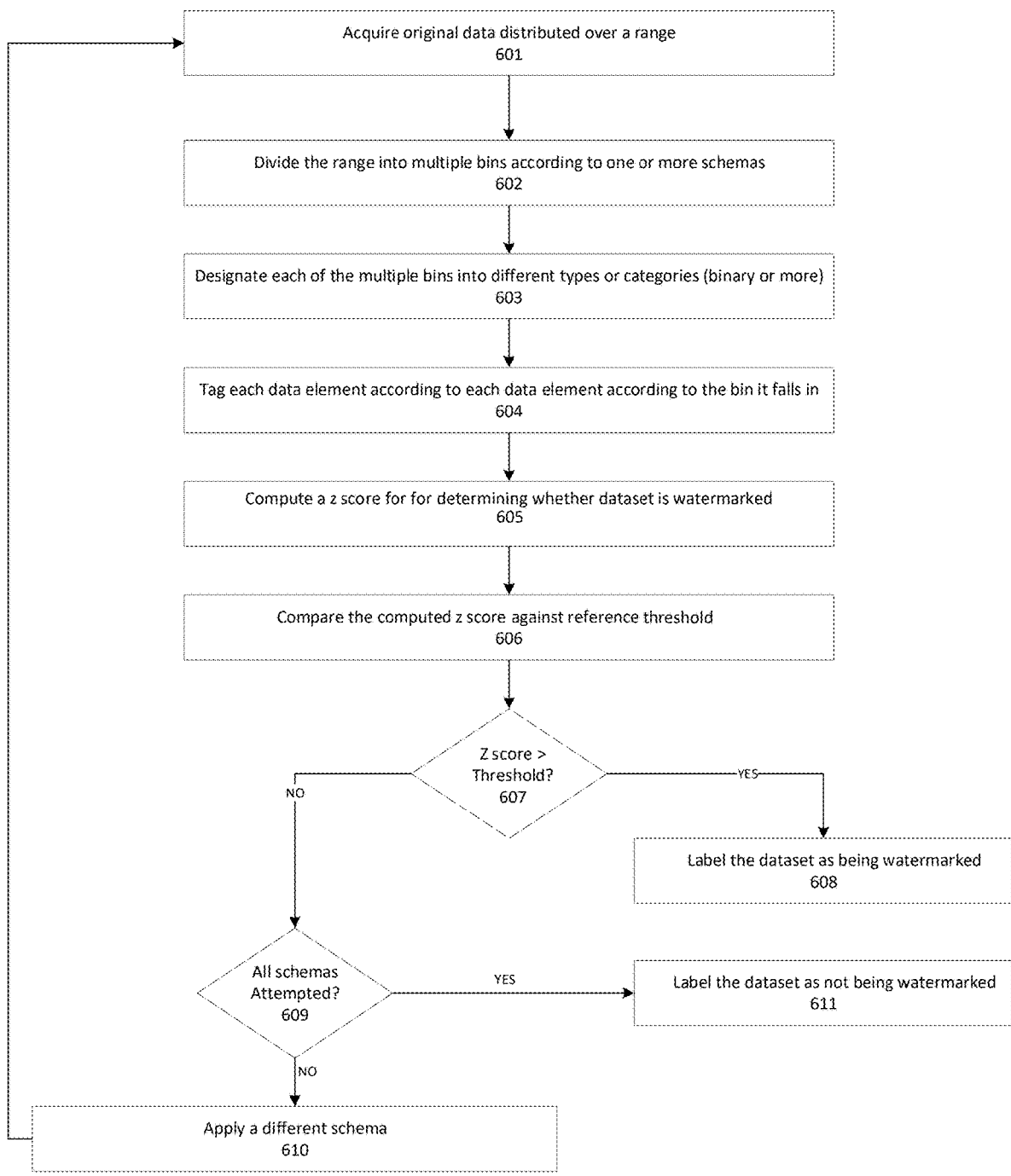
FIG. 6 illustrates a method for testing presence of a watermark in tabular data in accordance with an exemplary embodiment.

FIG. 6 illustrates a method for testing presence of a watermark in tabular data in accordance with an exemplary embodiment. FIGS. 7A-7D illustrate a process flow for testing presence of a watermark in tabular data in accordance with an exemplary embodiment.

In operation 601, a dataset distributed over a range is acquired from a source system. In an example, the distributed dataset may include watermarked data. According to exemplary aspects, the range may specify a lower limit value or a starting point and an upper limit value or an ending point. In an example, the lower limit value and/or the upper limit value may or may not correspond to a data element or value. Between the lower limit value and the upper limit value, the data elements or values included in the acquired dataset are distributed. In an example, the acquired dataset may be distributed randomly, according to a statistical distribution, according to a mathematical relationship or the like. According to an exemplary aspects, the range may be specified based on the values or a number of the data elements included in the original dataset. For example, the range may be set for statistical accuracy, based on a business requirement, based on a timeframe or the like.

Figure 7A:
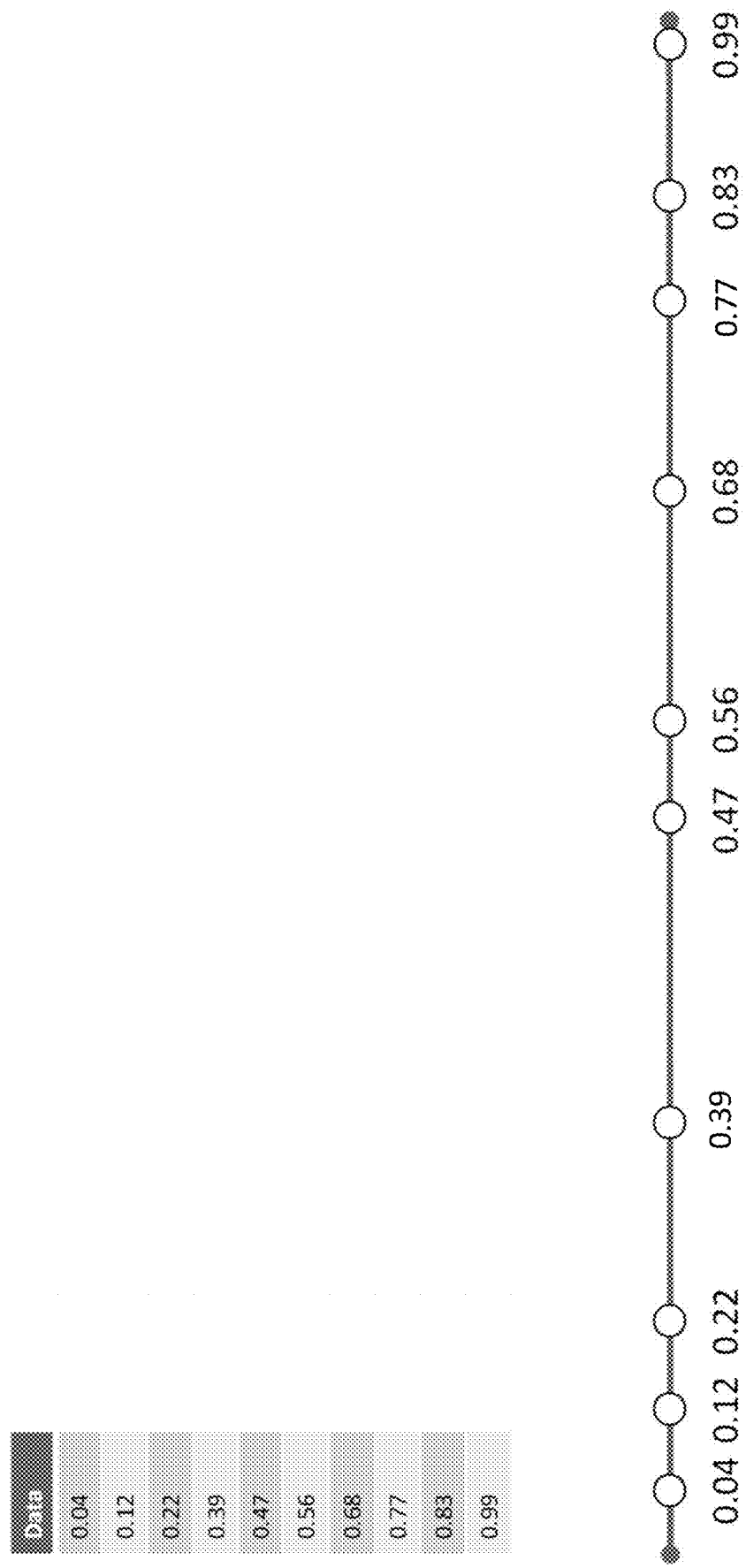
FIGS. 7A-7D illustrate a process flow for testing presence of a watermark in tabular data in accordance with an exemplary embodiment.

As exemplarily illustrated in FIG. 7A, the range may be between a value of 0 and a value of 1.00. The original data values are non-uniformly distributed over the range, and includes data elements or values of 0.04, 0.12, 0.22, 0.39, 0.47, 0.56, 0.68, 0.77, 0.83 and 0.99.

In operation 602, the range of values are divided into multiple bins according to a scheme among multiple schemes that may be prestored. According to exemplary aspects, a bin size and a number of bins may depend on the range of dataset that are to be watermarked. Further, the bin sizes for the multiple bins may not be uniform in size, such that certain bins may be smaller than other bins. Moreover, according to further aspects, dictionary of watermarking schemes may be pre-stored and correspond to different binning sizes. A dictionary of watermarking scheme corresponding to the selected binning size may automatically be applied during generation time. However, aspects of the present disclosure are not limited thereto, such that the size of the bins and number of bins to which the identified range is split into may be manually set, determined based on historical or type of data, determined based on strength of watermarking selected or necessary, determined based on a size of the range and/or determined by one or more ML or AI algorithms or models.

Figure 7B:
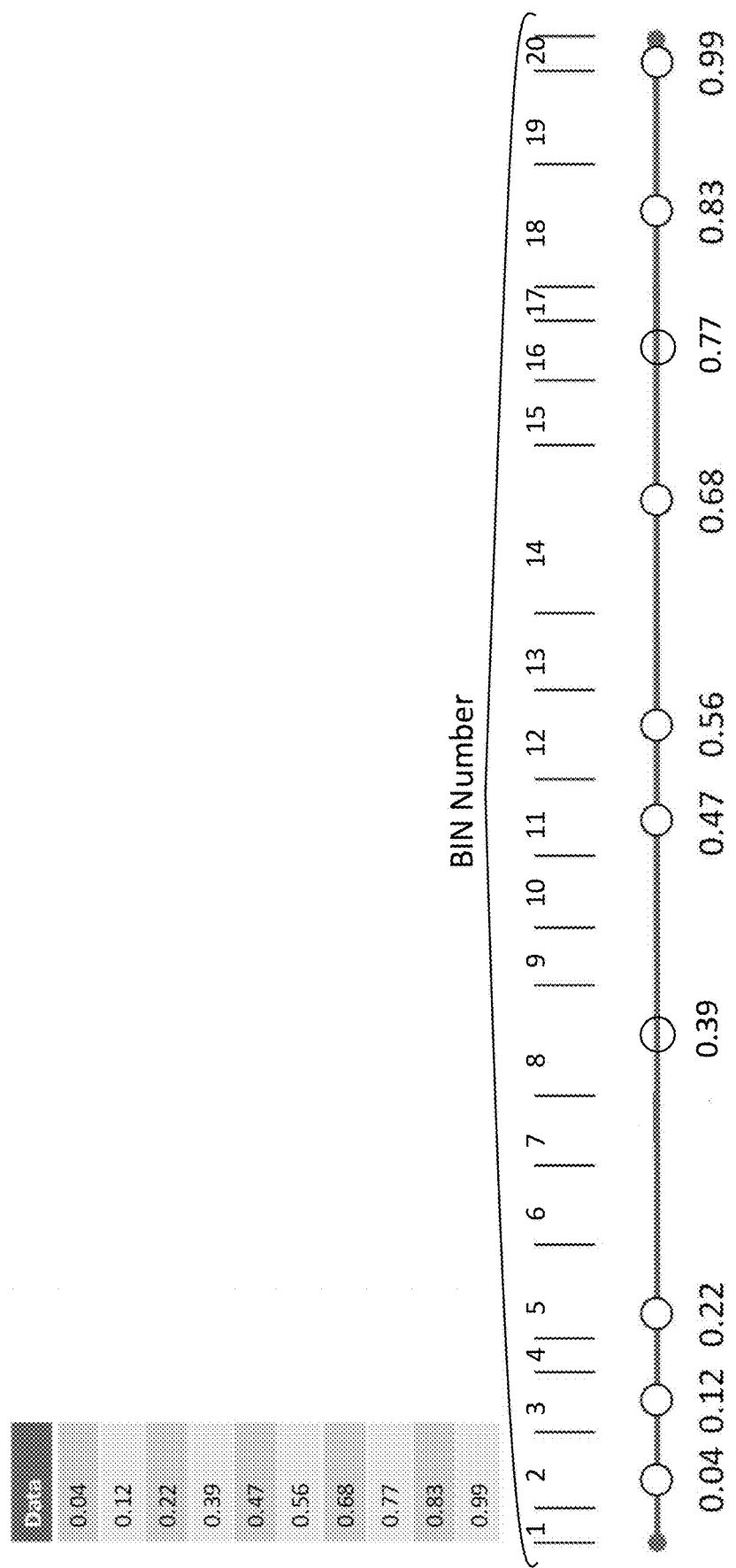

According to exemplary aspects, the watermarking schemes may include, without limitation, a fixed scheme, a random scheme, a scheme based on statistical distribution, a scheme based on a mathematical relationship and other uniquely defined schemes. For example, under a fixed scheme, each of the bins are of the same size. However, as illustrated in FIG. 7B, the multiple bins may of different sizes under different schemes. Further, number of bins may be specified based on bin sizes necessary for the data values distributed over the range. According to exemplary aspects, one or more bin sizes may be selected or defined according to a scheme selected. In FIG. 7B, twenty non-uniform sized bins are defined for the distributed data, arranged from left to right direction. As further illustrated in FIG. 7B, each of the bins are adjacent to one another without space therebetween. Also, not all of the bins will include an originally distributed data value.

Figure 7C:
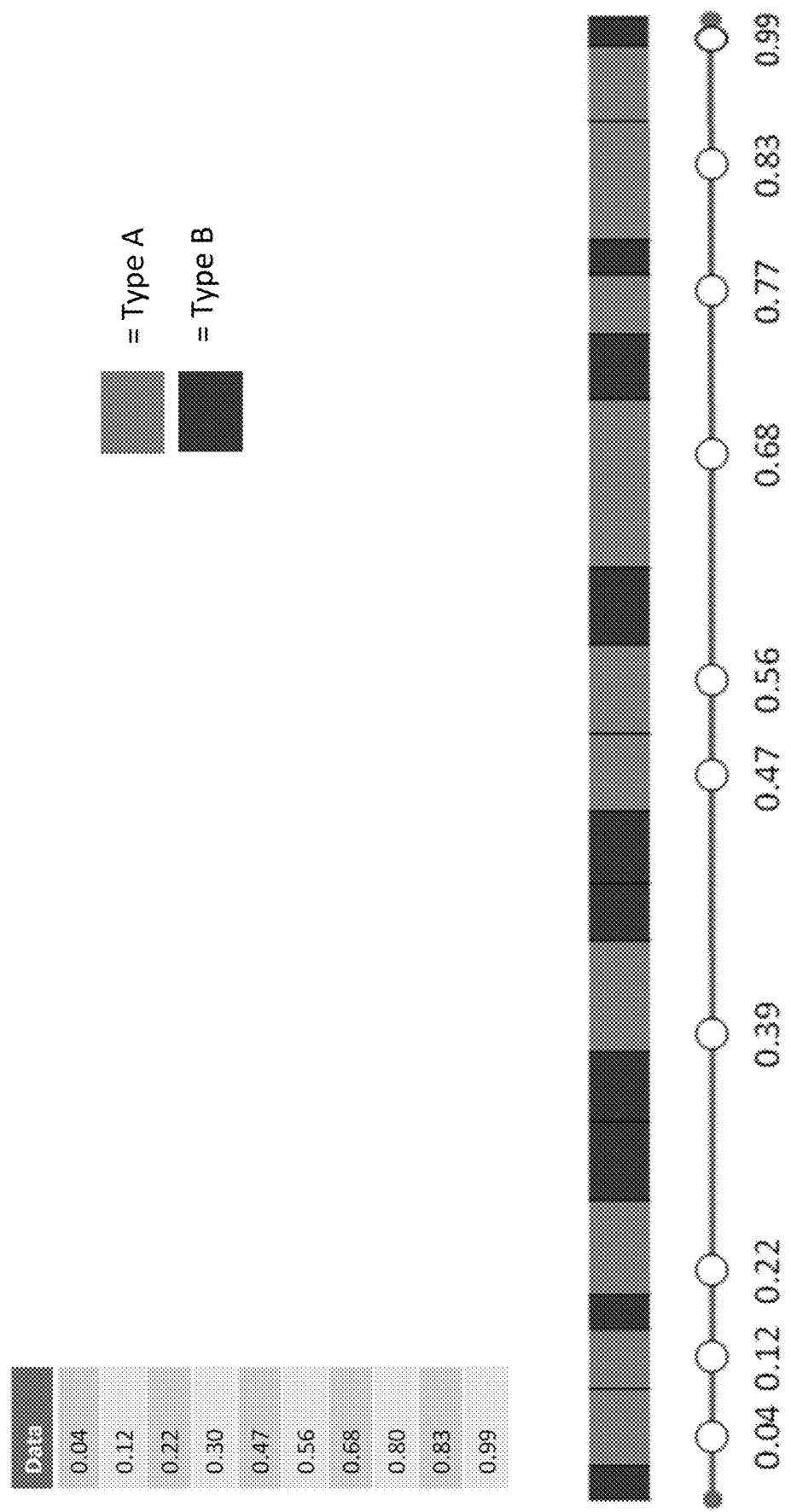

In operation 603, each of the multiple bins is designated into a particular bin type among different types or categories. According to exemplary aspects, each of the defined bins may be attributed to a particular type or category by a random generator. According to further aspects, the different types attributed may be binary, such as type I and II, type A and type B, red type and green type, and the like. As illustrated in FIG. 7C, each of the multiple bins are assigned to either a first type (i.e., type A) or a second type (i.e., type B). More specifically, first bin to the twentieth bins are arranged in a left to right direction in FIG. 7C. The first bin is assigned to the second type, the second bin and the third bin are assigned to the first type. The fourth bin is assigned to the second type and the fifth bin is assigned to the first type. The sixth bin and the seventh bin are assigned to the second type. The eighth bin is assigned to the first type, and the nineth and tenth bins are assigned to the second type. The eleventh and the twelfth bins are assigned to the first type. The thirteenth bin is assigned to the second type, which is followed by the fourteenth bin assigned to the second bin. The fifteenth bin is assigned to the second type, which is followed by the sixteenth bin assigned to the first type. The seventeenth bin is assigned to the second type, with the eighteenth and nineteenth bins assigned to the first type. Lastly, the twentieth bin is assigned to the second type. As illustrated above, the bins are randomly assigned to different types without any particular pattern.

Although binary types are disclosed herein, aspects of the present disclosure are not limited thereto, such that the bins may be designated or assigned to one of multiple types, in which the multiple types include more than two types.

Figure 7D:
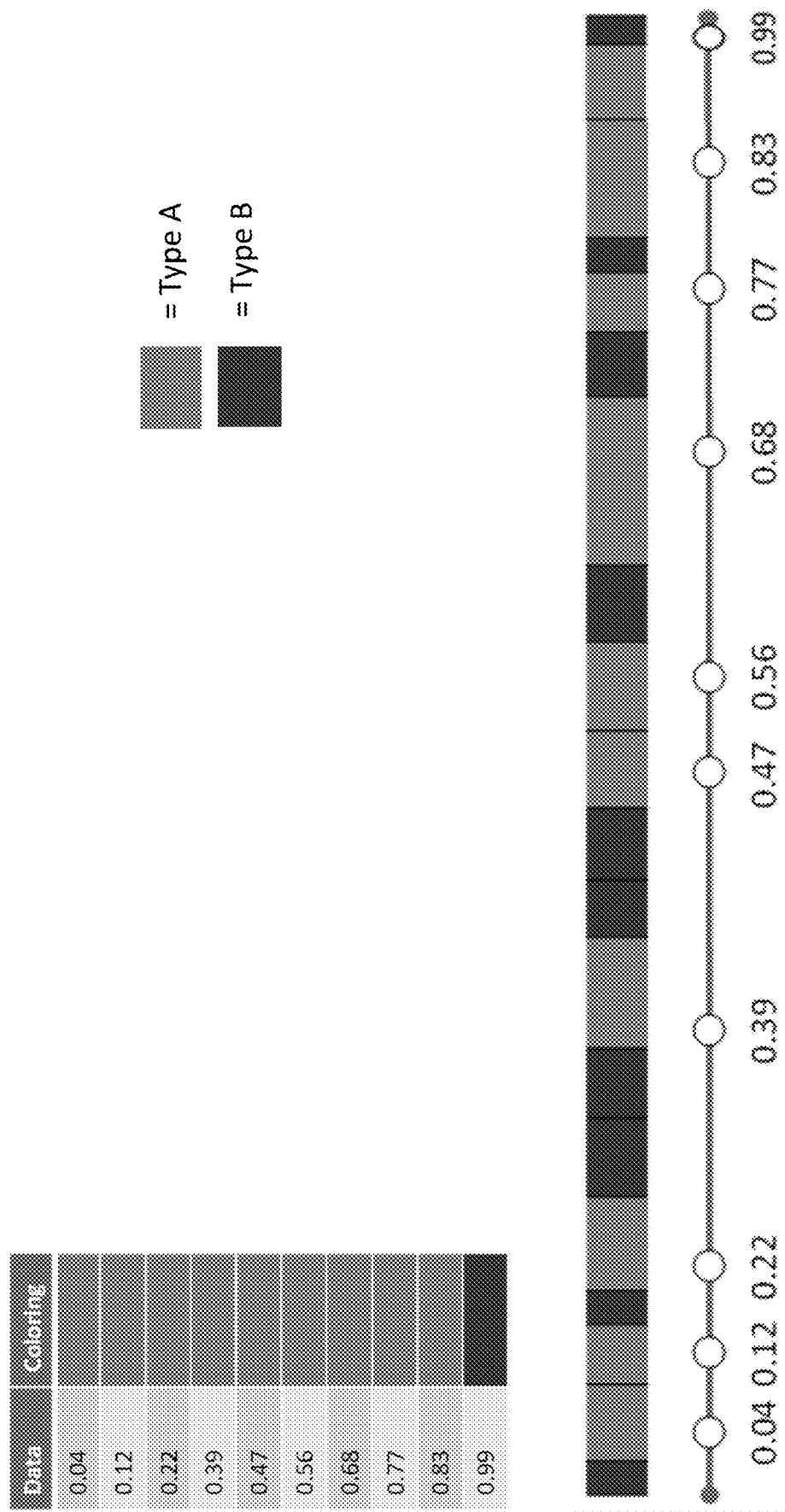

In operation 604, each data element in the dataset is tagged according to each data element according to the bin it falls in. Not all of the bins created will include a distributed data value. More specifically, some of the bins will include a data value, whereas other bins will not include a data value. As illustrated in FIG. 7D, each of bins 2, 3, 5, 8, 11, 12, 14, 16, 18 and 20 include a data value, whereas bins 1, 4, 6, 7, 9, 10, 13, 15, 17 and 19 are void of data values. Further, a bin type is identified for each of the bins. More specifically, bin types of bins including the data values are identified. As illustrated in FIG. 7D, it is determined that all of the data elements or values except for the data element of 0.99 falls in a bin of the first type. On the other hand, the data element 0.99 falls in a bin of the second type.

In operation 605, a z value or score is determined or computed for the dataset with respect to a reference threshold for determining whether the respective dataset is watermarked or not. For example, the z value may be calculated using the below equation:

$$z = 2(m_g - km/2)/\sqrt{mk}$$

In the above noted equation, $m_g$ may refer to a number of data values that have been assigned to the green bins or bins of the first type. Further, the k value may refer to a number of numerical columns, and m may refer to a number of data values included in the dataset. Although the z value or score is described as being calculated for the full dataset, aspects of the present disclosure are not limited thereto, such that the z value or score may be determined or calculated when a sufficient number of datapoints, or subset of datapoints (of size m×k), within the dataset are present.

However, aspects of the present disclosure are not limited thereto, such that a probability that that data value of the dataset is water marked may be determined instead of determining the z value or score for the dataset. For example, such probability may be determined using the below noted formula:

$$P(\text{data is watermarked}) = (1 - P(\text{data was colored at random}))$$

Further, probability that the data was colored at random may be determined using the below noted equation:

$$P(\text{data was colored at random}) = \binom{N}{M} P_g^N$$

In the above noted equation, N may refer to a number of data elements or values, M may refer to a number of data elements belonging into bins of the first type, and $P_g$ may refer to a probability that an element would be assigned to a bin of a first type at random. According to exemplary aspects, at least based on the above noted computations, strong statistical confidence measure for watermarking detection may be provided.

In operation 606, the computed z value or score is compared against a reference threshold to determine whether the data is watermarked or not.

In operation 607, a determination of whether the computed z score (or simply score) is greater than the reference threshold is performed. If the computed z score is determined to be greater than the reference threshold, then the method proceeds to operation 608 and the data is labeled as being watermarked. However, if the computed z score is determined to be less than the reference threshold, a check is performed to determine whether all of the dictionary of schemes have been applied in operation 609.

If it's determined that not all of the dictionary of schemes have been applied, then another scheme that has not yet been applied is selected and applied in operation 610, and the method proceeds back to operation 601 with the scheme applied in operation 610. However, if it's determined that all of the dictionary of schemes have been applied, then the respective data is labeled as not being watermarked in operation 611.

FIG. 8 illustrates an algorithm for watermarking of data in accordance with an exemplary embodiment.

According to exemplary aspects, to account for being robust to an attack by an adversary with noise, an algorithm exemplarily illustrated on FIG. 8 based on binning the data may be provided. In an example, an adversary may be an entity that gains access to data generated by a generator and utilizes the generated data for its applications. According to exemplary aspects, a generator may refer to a device or system that generates high-fidelity data trained on an original real dataset. Watermarking may be added to such data to establish that the respective data is produced or generated by a user's system.

In an example, an adversary may round the dataset to convert the floats to an integer, which may potentially break the watermark. Alternatively, the adversary may subsample either the rows or columns of dataset while sharing or doing analysis. Accordingly, to prevent against such malicious actions by the adversary, a more robust watermarking may be added to the underlying data via the presently disclosed system and method, such that the applied watermark may remain intact even when subjected to various data manipulations by the adversary.

In the algorithm of FIG. 8, fixed bin sizes ranging across various sizes (e.g., {10-1, 10-2, 10-3, . . . }) may be utilized depending on tradeoff between fidelity to the real data and noise sensitivity. For the computation of the hash, the system may be limited to the first "p" significant digits in the mantissa. According to exemplary aspects, hash or hash value may refer to a unique numerical value or set of values that is produced to identify the corresponding data element. However, aspects of the present disclosure are not limited thereto, such that a combination of alphanumeric characters may be utilized for generating a hash value. By performing the hashing operation, integrity of the tabular data may be verified. However, aspects of the present disclosure are not limited thereto, such that if datapoints do not have a mantissa, then some predefined hashes may be utilized to generate the bins of the first type (e.g., green) and bins of the second type (e.g., red). In an example, the predefined hashes may be secretly known only to the data provider. According to exemplary aspects, one of the predefined hashes may be selected at random. Similarly, during detection, each of the predefined hashes may be checked one by one until the selected predefined hash is identified.

According to further aspects, the computed hash value may be used to initialize a random number generator. By using the computed hash value as a seed, the random number generator may generate various values that follow a probability distribution. According to exemplary aspects, number sequence generated by the random number generator may be determined by the seed, such that if the random number generator is reinitialized with the same seed, same sequence of numbers may be provided. A choice of seed may play a role in the strength of security. For example, when a secret encryption key is randomly generated, having the seed may allow one to obtain the key. In high entropy situations, selection of a strong seed data may be instrumental in providing robust data security.

According to exemplary aspects, certain percentage of the values or numbers that are generated by the random number generator may be greater than the hash value, and the remaining percentage of values or numbers that are generated by the random number generator may be less than the hash value. In an example, the random generator may be seeded using hash of the mantissa, which may then be utilized to generate random uniform values from [0, 1]. Once the random values are generated, 1 to 1 mapping is established between each output of the random uniform generator with the bins. If the random uniform generator value is greater than 0.5, the respective value may be included in the first bin type (e.g., green) list, and the random uniform generator values that are less than 0.5 may be included in the second bin type (e.g., red) list.

According to exemplary aspects, a consistent first type bin cell (e.g., green cell) is one whose hash (e.g., based on bin center) when generating red and green lists may ensure that the first bin type cell stays first type (e.g., green) where the initial bin type may have been due to a different hash (corresponding to another bin).

According to exemplary aspects, a standard z-test for detecting a watermark may be utilized. For example, a z-score may be computed using the below noted equation:

$$z = 2(m_g - km/2)/\sqrt{mk}$$

In the above noted equation, $m_g$ may refer to a number of values that may have been assigned to green or first bins.

According to further aspects, the z-score may be utilized to reject the null hypothesis that the dataset is not watermarked if the value is above a chosen threshold. For example, when z>3, z value would correspond to p-value of 1e−3 at significance level of 0.5.

Moreover, the approach exemplarily illustrated in FIG. 8 has been extended to handle characteristic and/or integer columns by applying a similar scheme. Although one possible scheme is illustrated herein, aspects of the of the present disclosure are not limited thereto, such that the respective scheme may be combined with the mantissa approach of FIG. 8. Although all numerical columns in the algorithm of FIG. 8 have been watermarked, aspects of the present disclosure are not limited thereto, such that as few as 1 column may be watermarked, or some number of columns between 1 and the k number of columns.

According to exemplary aspects, characteristic of data value $S_t$ is split into left and right parts. The split may be adaptive to the size of the number (e.g., 10345). Further, the data may be split into the left and right parts adaptively, and beyond the decimal point (e.g., most significant bits vs. least significant bits). In this regard, the split left part may be utilized for the binning operation, and may be persevered. If an adversary is changing the split parts, it may significantly degrade the quality of data. Accordingly, two separate binning schemes may be utilized for the left and right parts or components for additional data security.

According to further aspects, when multiple numerical columns are present in the dataset, the above noted scheme may be adapted to use one column values for the hashing and the other for complying with the first bin type (e.g., green) list and second bin type (e.g., red) list. This may necessitate evaluation of every pair of numerical columns (in the worst case scenario) in the detection phase to ensure that the data is watermarked.

Moreover, adaptive bin sizes may be implemented based on the distribution of data values. The adaptive bin sizes may correspond to predetermined watermarking schemes, but may be applied based on the best matching profile.

According to exemplary aspects, the above noted approach may be used for both generated data as well as existing data as a post-processing step. Further, the above noted approach may be applied for watermarking both real data as well as synthetic data. Here, unlike large language models where the data sequence depends on the ordering of the tokens, tabular data is much more amenable to encoding watermarks without distorting the sample.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for watermarking a dataset generated by a source system, the method comprising:
   acquiring, by a processor, the dataset generated by the source system;
   distributing, by the processor, a plurality of data elements included in the dataset over a range;
   dividing, by the processor, the range into a plurality of bins according to a scheme among a plurality of schemes;
   designating, by the processor, each of the plurality of bins as a first type or a second type;
   tagging, by the processor, each data element among the plurality of data elements according to a bin type of a bin the respective data element falls into;
   for each data element included in a bin of the second type, selecting a new value by sampling within a nearest bin of the first type and replacing the respective data element with a replacement data element including the new value; and
   watermarking, by the processor, each data element originally included in the bins of the first type and replacement data elements for generating a watermarked dataset.

2. The method according to claim 1, wherein the data values are distributed over the range using a scheme among the plurality of schemes stored in a database.

3. The method according to claim 2, wherein the plurality of schemes include a fixed scheme, a random scheme, a mathematical relationship scheme and a statistical distribution scheme.

4. The method according to claim 1, further comprising:
   selecting, by the processor, the scheme among the plurality of schemes based on the dataset generated by the source system.

5. The method according to claim 1, wherein a number of bins of the plurality of bins is determined based on the plurality of data elements of the dataset.

6. The method according to claim 1, wherein a number of bins of the plurality of bins is determined based on size of one or more bins of the plurality of bins.

7. The method according to claim 1, wherein, in the designating, each of the plurality of bins is randomly designated as the first type or the second type.

8. The method according to claim 1, wherein the new value is selected using a scheme among the plurality of schemes.

9. The method according to claim 8, wherein the scheme is a statistical distribution of the plurality of data elements.

10. The method according to claim 8, wherein the scheme is a mathematical relationship with respect to the plurality of data elements.

11. The method according to claim 8, wherein the scheme is a random generation.

12. The method according to claim 1, wherein the watermarking is performed on pairs of columns of data elements, and
   wherein each of the pairs of columns of data elements include a seed column.

13. The method according to claim 1, further comprising:
   adding, by the processor, one or more artificial data elements corresponding to bins of the second type prior to the watermarking.

14. The method according to claim 13, wherein the watermarking with the one or more artificial data elements generates a soft watermarked dataset.

15. The method according to claim 1, further comprising computing a score that the dataset is watermarked.

16. The method according to claim 15, wherein the score that the dataset is watermarked is calculated according to a below relationship:

$$z = 2(m_g - km/2)/\sqrt{mk}$$

wherein
   z is the score,
   $m_g$ is a number of data elements that have been assigned to the bin of the first type,
   k is a number of numerical columns in the dataset, and
   m is a number of the data elements included in the dataset.

17. The method according to claim 16, further comprising:
   comparing the score that the dataset is watermarked against a reference threshold.

18. The method according to claim 17, wherein
   when the score that the dataset is watermarked is greater than the reference threshold, labeling the dataset as watermarked, and when the score that the dataset is watermarked is less than the reference threshold, selecting a different scheme among the plurality of schemes until the score that the dataset is watermarked is calculated to be greater than the reference threshold.

19. A system for watermarking a dataset generated by a source system, the system comprising:
   a memory; and
   a processor,
   wherein the system is configured to perform:
   acquiring the dataset generated by the source system;
   distributing a plurality of data elements included in the dataset over a range;
   dividing the range into a plurality of bins according to a scheme among a plurality of schemes;
   designating each of the plurality of bins as a first type or a second type;
   tagging each data element among the plurality of data elements according to a bin type of a bin the respective data element falls into;
   for each data element included in a bin of the second type, selecting a new value by sampling within a nearest bin of the first type and replacing the respective data element with a replacement data element including the new value; and
   watermarking each data element originally included in the bins of the first type and replacement data elements for generating a watermarked dataset.

20. A non-transitory computer readable storage medium that stores a computer program for watermarking a dataset generated by a source system, the computer program, when executed by a processor, causing a system to perform a plurality of processes comprising:
   acquiring the dataset generated by the source system;
   distributing a plurality of data elements included in the dataset over a range;
   dividing the range into a plurality of bins according to a scheme among a plurality of schemes;
   designating each of the plurality of bins as a first type or a second type;
   tagging each data element among the plurality of data elements according to a bin type of a bin the respective data element falls into;
   for each data element included in a bin of the second type, selecting a new value by sampling within a nearest bin of the first type and replacing the respective data element with a replacement data element including the new value; and
   watermarking each data element originally included in the bins of the first type and replacement data elements for generating a watermarked dataset.

* * * * *